Jan. 26, 1932.                R. L. SHORES ET AL                1,843,046
ANIMAL TRAP
Filed May 31, 1930            2 Sheets-Sheet 1
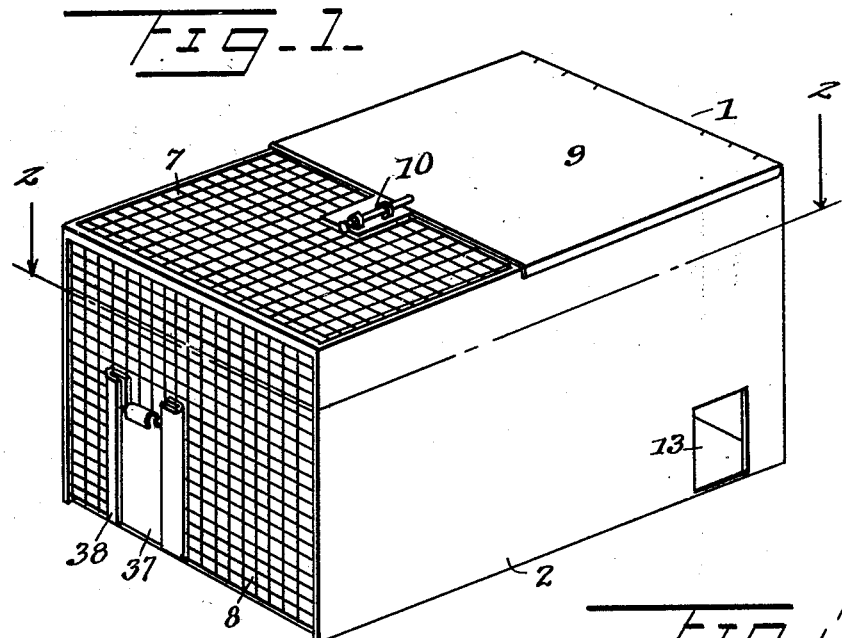
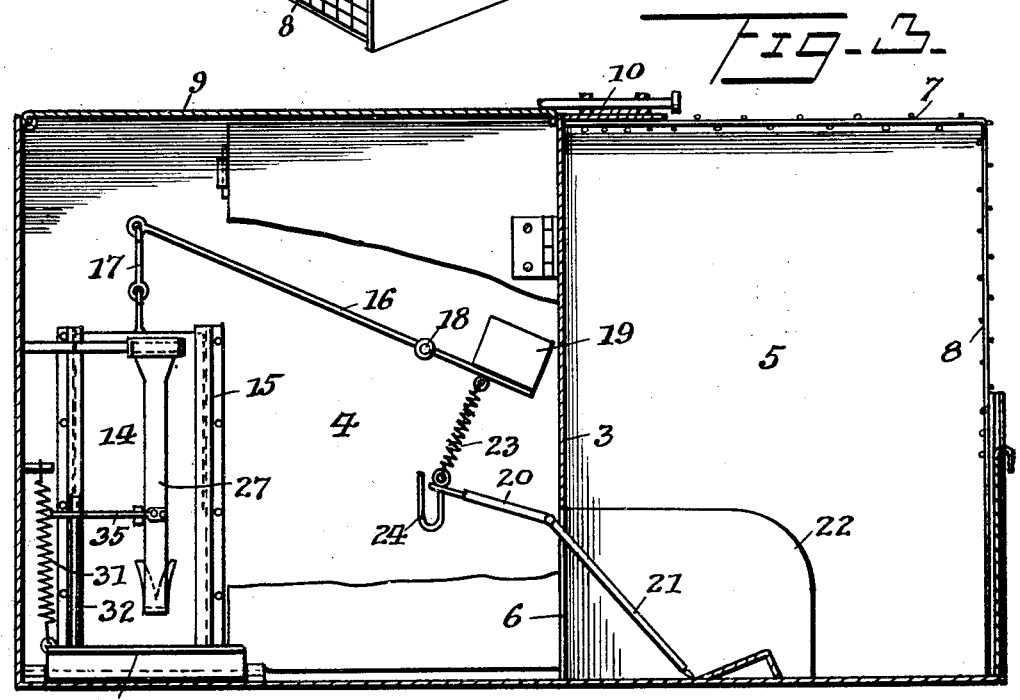
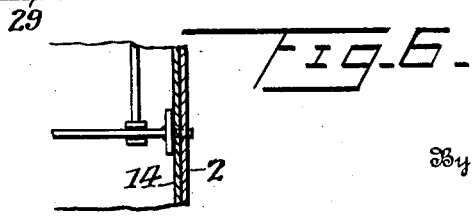
Inventors
R. L. Shores
and J. Currie
By Jacobi & Jacobi
Attorneys Jan. 26, 1932. R. L. SHORES ET AL 1,843,046
ANIMAL TRAP
Filed May 31, 1930 2 Sheets-Sheet 2
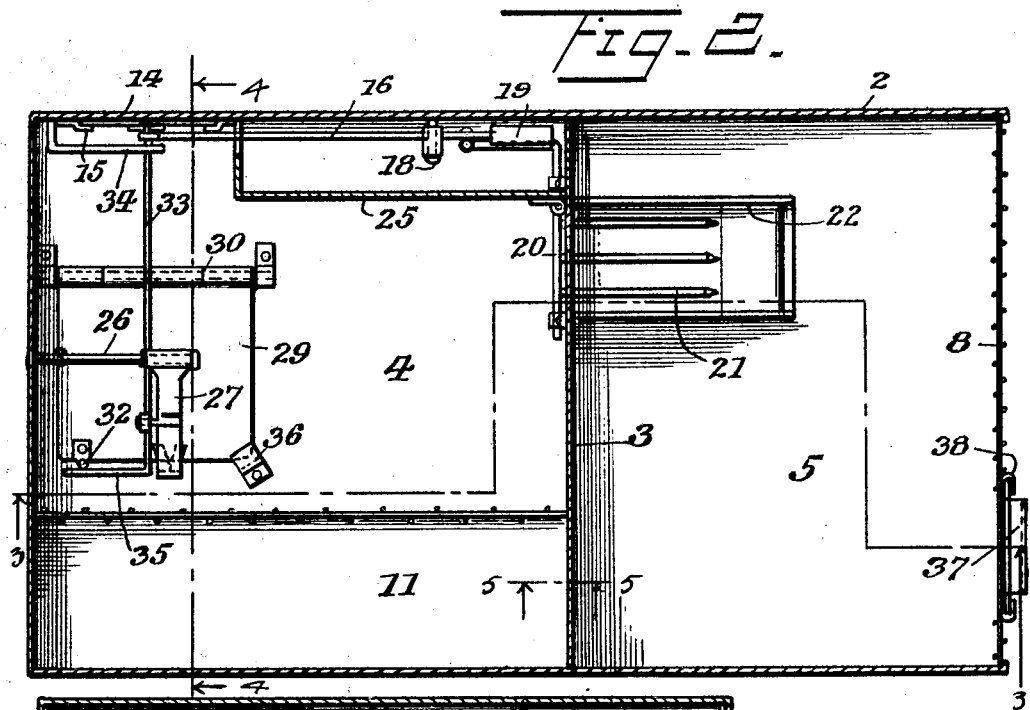
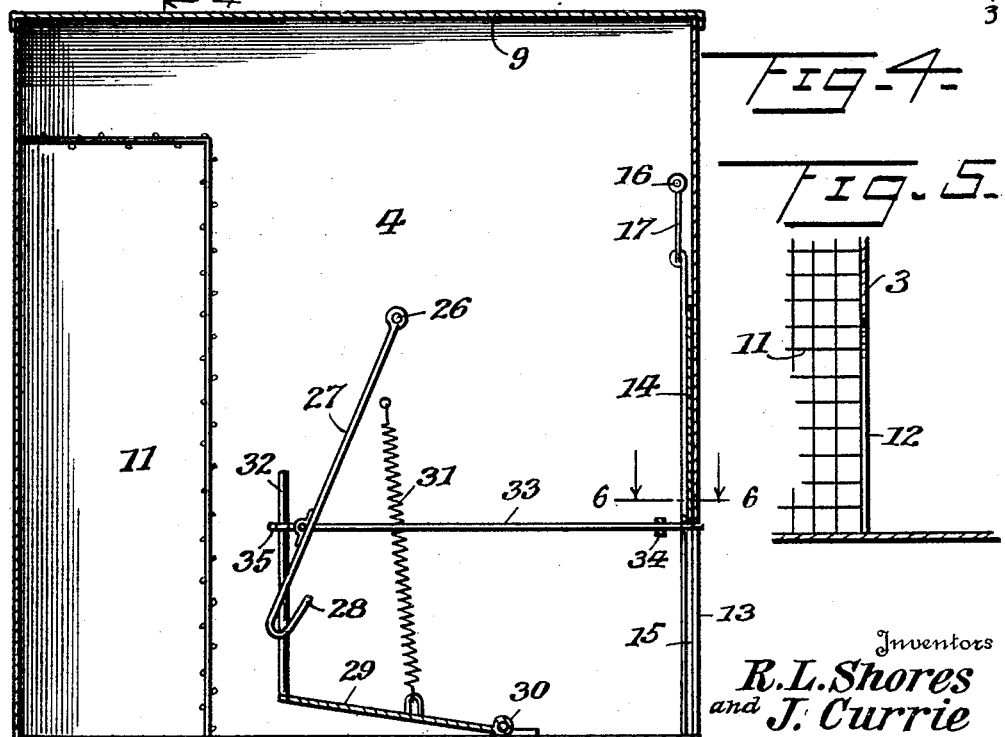
Inventors
R. L. Shores
and J. Currie
By Jacobi & Jacobi
Attorneys Patented Jan. 26, 1932

1,843,046

UNITED STATES PATENT OFFICE

ROY L. SHORES AND JAMES CURRIE, OF BIG SPRING, TEXAS

ANIMAL TRAP

Application filed May 31, 1930. Serial No. 458,523.

The present invention relates to improvements in animal traps and has for its principal object to provide a trap for catching and imprisoning animals, the trap being automatically set by the imprisoned animal when passing from one compartment into another, thereby rendering it unnecessary for a person to set the trap each time an animal is caught.

A further object is to provide an animal trap of the above mentioned character which will at all times be positive and efficient as well as automatic in its operation, the same being further simple in construction, inexpensive, strong and durable.

Other objects and advantages of the present invention will become apparent from the following description when taken in connection with the accompanying drawings.

In the accompanying drawings wherein like reference characters indicate corresponding parts throughout the several views:

Figure 1 is a perspective view of the animal trap embodying our invention.

Figure 2 is a horizontal sectional view taken approximately on the line 2—2 of Figure 1 looking downwardly.

Figure 3 is a vertical longitudinal sectional view taken substantially on the line 3—3 of Figure 2, looking in the direction of the arrows.

Figure 4 is a transverse section taken on the line 4—4 of Figure 2, looking in the direction of the arrows.

Figure 5 is a detail sectional view taken on the line 5—5 of Figure 2, and

Figure 6 is a sectional view taken substantially on the line 6—6 of Figure 4, looking downwardly.

In the drawings wherein for the purpose of illustration is shown the preferred embodiment of our invention, the numeral 1 designates generally our improved animal trap, the same comprising a rectangular shaped casing 2. A vertical partition 3 is arranged in the intermediate portion of the casing for dividing the same into a bait compartment or chamber 4 and imprisoning chamber or compartment 5 and communication is afforded between these compartments by means of an entrance opening 6.

The top and outer end of the imprisoning compartment 5 is open and a wire mesh screen covering 7 is provided for the open top side of this compartment, similar wire mesh screen 8 providing a closure for the outer open end of the imprisoning compartment as suggested very clearly in Figures 1 and 3 of the drawings. The top of the bait compartment is also open, and a hinged sheet metal cover 9 provides a closure therefor, a manually operable latch 10 being provided to secure the cover 9 in its closed position.

An auxiliary imprisoning chamber 11 is arranged at the rear side of the bait compartment 4 and extends for the full length thereof, the auxiliary imprisoning chamber having communication with the main imprisoning chamber 5 through the medum of the passage 12 provded in the partition 3, and this feature is more clearly illustrated in Figures 2 and 5 of the drawings.

An entrance 13 is formed in the front side wall of the bait compartment 4 and cooperating with this opening is the vertically sliding door 14 that operates within suitable guides 15 arranged on the inner face of the front wall of the bait compartment at opposite sides of the opening 13. The door 14 is suspended from one end of a lever 16 through the medium of a link 17, this lever being pivoted adjacent its opposite end on the inner face of the front wall of the bait compartment 4, as at 18. A counterweight 19 is carried by the pivoted end of this lever 16.

A pivoted end of the lever 16 is operatively connected to a crank arm 20 and this arm is in turn operatively associated with the vertically swinging gate 21 that provides a closure for the passageway 6, the gate 21 extending into the imprisoning compartment 5 and being normally disposed at an incline. This gate is operable between the side walls of a guide way chute 22 arranged within the imprisoning chamber 5 and disposed in alinement with the passage 6.

The crank arm 20 is supported horizontally in suitable bearings arranged on the partition 3 and a spring 23 cooperates with a hooked link 24 to provide an operative connection between the pivoted end of the lever 16 and the laterally extending portion of the crank arm 20 as illustrated very clearly in Figure 3 of the drawings.

A horizontally swinging door 25 provides a closure for the connected portions of the lever and the crank arm, it being understood of course that the door is formed with suitable slots to facilitate the proper functioning of the pivoted lever and the crank arm.

Suspended from the inner end of a pin 26 that projects inwardly from the outer end wall of the bait compartment 4 at the central portion thereof is the bait holding member 27, the same being in the form of a flat bar formed at its upper end with an eye or sleeve that encircles the pin 26, the lower end of this bar being bent upwardly and formed with a fork to receive and securely hold the bait thereon, the bait holding fork portion of the member 27 being denoted by the numeral 28.

Arranged directly below the pivotally suspended bait holding member 27 is the pivoted treadle 29 and this treadle is hinged at its forward edge to the floor of the bait chamber or compartment 4 as at 30. A coil spring 31 is connected at its upper end to the outer end wall of the bait chamber 4 and at its lower end to the intermediate portion of the treadle 29 for normally holding the same in a raised position as indicated more clearly in Figure 4 of the drawings. A post 32 is carried by the rear edge portion of the treadle 29 and extends upwardly therefrom for a purpose to be presently described.

Forming a salient part of the present invention is the horizontally disposed trigger 33, the forward end thereof being slidable through a guide bracket 34 that is carried by the front wall of the bait chamber 4 adjacent the upper edge of the entrance 13, the forward end of the trigger being adapted to extend through the entrance 13 for engagement with the lower edge of the door 14 to support the latter in its raised position when the trap is set. The trigger 33 is operatively connected to the intermediate portion of the pivotally suspended bait holding member 27 for movement therewith and the rear end of this trigger terminates in a laterally extending finger 35 that cooperates with the upstanding posts 32 in the manner to be presently described. A stop 36 is provided for limiting the upward swinging movement of the pivoted treadle 29.

An exit opening is provided in the outer end wall of the imprisoning chamber 5 and a sliding door 37 provides a closure for this exit opening, the door being arranged for sliding movement between suitable guides 38 shown more clearly in Figures 1 and 2 of the drawings.

The operation of our improved animal trap may be briefly stated as follows. Normally the parts are arranged as shown in Figure 4 of the drawings. The animal enters the bait compartment 4 through the entrance 13 and in order to reach the bait supported on the forked lower end 28 of the bait holding member 27, the animal must necessarily step upon the treadle 29. Promptly upon the depression of the treadle 29, the posts 32 will actuate the laterally extending finger 35 to effect the rearward sliding movement of the trigger 33 so that the forward end of the trigger will be brought out of engagement with the lower edge of the door 14 and the door will by gravity move downwardly to close the entrance 13 thus entrapping the animal in the bait chamber 4.

The animal thinking to escape from the chamber 4 will pass through the opening or passage 6 in the partition 3 into the imprisoning chamber 5 and this will result in the gate 21 being raised by the animal to operate the crank arm 20 which arm in turn actuates the lever 16 to again raise the door 14 and the trigger 33 will move forwardly so that the forward end of the trigger will again be in position beneath the lower edge of the door 14 to hold the same in its raised position thus resetting the trap for the next animal.

The animals entering the imprisoning chamber 5 cannot escape therefrom but may pass into the auxiliary imprisoning chamber 11 that communicates with the main imprisoning chamber 5. The entrapped animals may be released from the prisoning chamber 5 by raising the door 37.

It will thus be seen from the foregoing description, that we have provided an animal trap adapted to be automatically set by the entrapped animal when passing from the bait compartment or chamber into the imprisoning compartment or chamber, thereby rendering it unnecessary for a person to set the trap each time an animal enters the same.

The simplicity of our trap enables the same to be constructed at a very low cost and yet be strong and durable.

While we have shown the preferred embodiment of our invention, it is to be understood that minor changes in the size, shape and arrangement of parts may be resorted to without departing from the spirit of the invention and the scope of the appended claims.

Having thus described the invention what we claim is:

1. An animal trap comprising a casing, a vertical partition dividing the casing into a bait chamber and an imprisoning chamber, the partition being formed with an opening providing communication between said chambers, the bait chamber being provided with an entrance in one side thereof, a vertically sliding door providing a closure for the entrance, an animal actuated vertically swinging door associated with the opening in the partition, permitting the entrance of the entrapped animal into the imprisoning chamber but preventing the return of the animal from the imprisoning chamber to the bait chamber, a trigger for holding the sliding door in a raised inoperative position, means for actuating the trigger to release the door and cause the same to move downwardly to an operative position over the entrance, additional means operatively connecting the sliding and swinging doors whereby the sliding door is raised and the trigger is reset when the animal passes into the imprisoning chamber and actuates the swinging door, said first mentioned means including a depressible treadle, a member extending upwardly from the depressible treadle and having its lower end rigidly secured to the treadle, and a laterally extending finger carried by the trigger and loosely engaged with the upstanding member whereby swinging movement of the upstanding member will slide the trigger into and out of position to support the sliding door in a raised position, and means yieldably retaining said treadle in its normal position.

2. An animal trap comprising a casing, a vertical partition arranged therein dividing the casing into a bait chamber and an imprisoning chamber, the partition being formed with a passage affording communication between the chambers, a vertically swinging gate providing a closure for the passage, and operable by the animal entering the imprisoning chamber, the bait chamber being provided with an entrance in the side wall thereof, a vertically sliding door providing a closure for the entrance, a sliding trigger arranged in the bait compartment to have its outer end extend through the entrance and engage beneath the lower edge of the door to hold the same in a raised position, a pivotally suspended bait holder mounted vertically in the bait compartment, a treadle arranged below the bait holder and pivoted at its forward edge to the bottom of the bait compartment, a post extending upwardly from the free edge portion of the pivoted treadle and rigidly secured thereto, spring means for normally holding the pivoted treadle in a raised position, the inner end portion of the slidable trigger being connected to the pivotally suspended bait holder, a laterally extending finger formed on the inner end of the trigger for cooperation with the outstanding post to effect the inward sliding movement of the trigger and the release of the sliding door to close the entrance when the treadle is depressed, and means operatively connecting the hinged gate with the sliding door for resetting the parts when the entrapped animal actuates the gate in passing into the imprisoning chamber.

In testimony whereof we affix our signatures.

ROY L. SHORES.
JAMES CURRIE.